United States Patent [19]
Nordgren

[11] 3,813,512
[45] May 28, 1974

[54] WELDING TIP ASSEMBLY

[75] Inventor: Alfred A. Nordgren, Holland, Mich.

[73] Assignee: New York Wire Mills Corporation, Tonawanda, N.Y.

[22] Filed: Jan. 2, 1970

[21] Appl. No.: 114

[52] U.S. Cl................................. 219/158, 219/75
[51] Int. Cl............................................. B23k 9/00
[58] Field of Search ........... 219/158, 159, 160, 161, 219/60, 59, 72, 136, 162, 130, 74, 75; 269/41; 81/90 A–90F, 90 R, 177 R, 177 C

[56] References Cited
UNITED STATES PATENTS

| 2,702,333 | 2/1955 | Anderson............................ 219/130 |
| 2,721,923 | 10/1955 | Anderson............................ 219/130 |
| 2,845,524 | 7/1958 | Morley, Jr. et al. ................ 219/130 |
| 2,863,983 | 12/1958 | Kane et al............................ 219/75 |
| 2,922,023 | 1/1960 | Hackman et al.................... 219/127 |

Primary Examiner—J. V. Truhe
Assistant Examiner—Clifford Shaw
Attorney, Agent, or Firm—Price, Heneveld, Huizenga & Cooper

[57] ABSTRACT

A work-holding canopy mounted over a welding tip and comprising a hood having one or more work-receiving jaws or grooves in it, the grooves having sides which taper together at the bottom thereof so as to cam together work pieces held therein. The hood also functions to confine the welding sparks and gases to the work area.

8 Claims, 4 Drawing Figures

INVENTOR
ALFRED A. NORDGREN

BY
Price, Heneveld, Huizenga & Cooper
ATTORNEYS

WELDING TIP ASSEMBLY

BACKGROUND OF THE INVENTION

In welding apparatus, there are generally two problems which must be solved regardless of the nature of the welding tip or the work pieces to be welded. These are the confinement of sparks at the welding point along with environmental gases present during the welding, and the accurate positioning of the work pieces to be joined. Previous attempts to solve these two problems have resulted in separate apparatus to solve each problem. The result has been expensive devices which have been cumbersome to use.

SUMMARY OF THE INVENTION

This invention relates to a work-holding and positioning attachment for a welding tip which has integral therewith a hood for confining the sparks and the environmental gases. Specifically, the invention provides a work-holding and positioning attachment for attachment to the tip of a welder for the welding together of two work pieces, the attachment comprising a mounting sleeve having an axis, a hood telescoped onto the sleeve and means integral with the hood for gripping together the work pieces.

Accordingly, it is an object of the invention to provide a work-positioning member wherein a hood is integral with the member.

It is a further object of the invention to provide a work-positioning member of the above character which is adjustable.

It is still another object of the invention to provide a work-positioning member of the above character wherein the member goes into position along with the welding tip, without requiring separate actuation.

It is a related object of the invention to provide a work-positioning member of the above character wherein the member is easily maneuvered in the neighborhood of the work.

Other objects and advantages of the invention will become apparent upon reference to the following drawings and detailed discussion.

DESCRIPTION OF THE PREFERRED EMBODIMENTS

Figure 2:
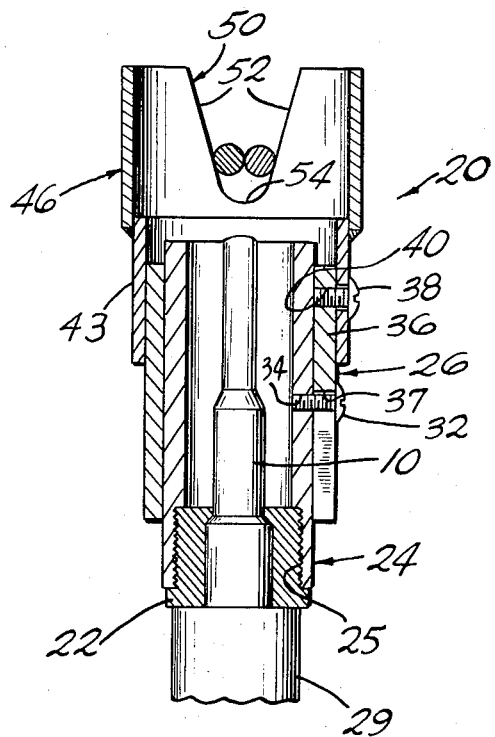
FIG. 2 is a sectional view taken along plane II—II of FIG. 1.
Figure 4:
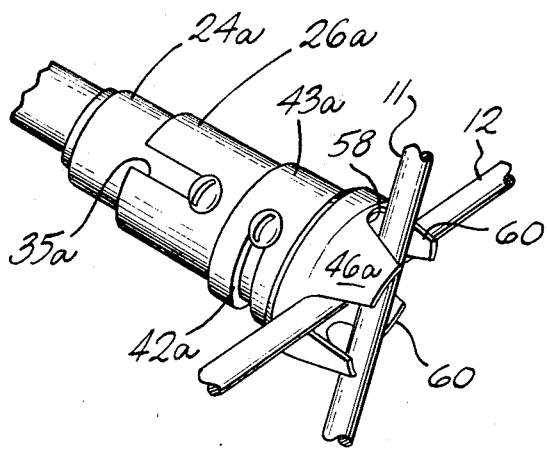
FIG. 4 is a perspective view illustrating the use of the embodiment of FIG. 3 of the invention in welding crossed wires.

The invention is utilized with a standard electrical welding apparatus to weld together wires, rods or articles of similar configuration. For example, a welding tool incorporating the invention can be utilized to weld together the overlapping extremities of a wire cage being formed as the reinforcement for the formation of a concrete pipe. Such a cage can be welded utilizing supports such as taught in my co-pending application entitled MANDREL APPARATUS, filed Dec. 29, 1969, Ser. No. 888,466 but the welding tip assembly utilizing my invention is obviously not limited to that application. Rather, it can be used with any standard welding assembly 10. Two such pieces can be gripped within the jaws as shown in FIGS. 2 and 4, the latter illustrating the welding of two wire rods 11 and 12.

In accordance with this invention, a nozzle canopy 20 is mounted concentrically with the tip 10 on a nipple 22 integral with the flexible welding supply conduit 29. This conduit, as will be readily appreciated by those skilled in the art, is connected to a welding machine and serves as channel through which the welding rod, environmental gases and the like are transmitted to the welding tip 10 from the machine. The member 20, in addition to functioning as a canopy, also embodies integrally the means 50 for gripping the work pieces. To mount the canopy 20 on the tip, a cylindrical mounting sleeve 24 is threaded at an end 25 so as to be threadable upon the nipple 22. The turning of the sleeve onto the nipple concentrically mounts the sleeve 24 so that the axis of the sleeve coincides with the axis of tip 10. This feature in conjunction with the telescoping of the other parts of the canopy over the sleeve 24 as will be described provides a simplified construction which insures that the tip 10 is centered on the work during the welding process.

In accordance with a related aspect of the invention, to make the canopy 20 adjustable with respect to the welding tip 10 both in the axial direction and circumferentially, a second sleeve, an adjusting sleeve 26, is telescoped over the mounting sleeve 24. To adjust the sleeve 26 axially, a screw 32 is turned into an appropriately threaded hole 34 in the sleeve 24. The sleeve 26 has a slot 35 in the wall 36 thereof, which slot will accommodate the shank of the screw 32 but is narrower than the width of the head of that screw. The slot terminates at a shoulder 37 part way along the length of the sleeve. The slot, as shown in FIG. 2, is therefore preferably only half the length of the sleeve 26. By this arrangement, the sleeve 26 will slide along the length of the mounting sleeve 22 up to the shoulder 37 until the screw 32 is tightened, thereby allowing the hood 46 to become longer or shorter with respect to the tip 10.

To adjust circumferentially the position of the work-holding parts of the canopy which are integral therewith, a screw 38 is turned into the sleeve 26 at an appropriately threaded hole 40. To allow the hood to be rotated on the sleeve 26, a slot is formed in the circumference of a third sleeve 43 welded to and depending from the sleeve 46. The slot extends 180° around the circumference of the sleeve 43. To allow the screw 38 to tighten the sleeve 43 into the desired circumferential position, the slot 42 is wide enough to accommodate the shank of the screw but not wide enough to allow the head of the screw to pass therethrough. Thus, when the screw 38 is tightened against the sleeve 43, that sleeve and the work-holding parts of the hood are held in the position to which they have been rotated by means of the slot 42 being guided by the screw 38.

With regard to the hood 46, to provide a simple construction which will shield the area at which the welding is done, the hood is cylindrical and is concentric to all the sleeves heretofore described. Thus, the tip 10 is positioned concentrically with respect to the hood. The gripping means on jaws 50 are integral with the hood, thereby eliminating the additional structure that would be necessary if the gripping means were a separate part.

To move the work pieces into position and retain them in abutment for welding, the gripping means 50 comprises a generally V-shaped cut made in opposite portions, the slots having sides 52 which taper together toward the bottom of the slot. To accommodate at the bottom of the slot a rounded work piece such as a wire rod, the bottom of the slot is also rounded at 54.

It will be apparent to one skilled in the art that the sides of the slot 52 act as camming surfaces so as to force together and toward the bottom of the slot one or more work pieces which are to be welded when the tip and canopy are pushed thereagainst. If, because of the size or number of the work pieces, they do not push sufficiently far toward the bottom 54 of the slot for proper welding, adjustment can be made by simply loosening the screw 32 and moving down the sleeve 26 over that screw until the right separation of the tip 10 and the work pieces is obtained. It will also be apparent to one skilled in the art that the slot 42 allows the work-holding grooves or cuts 52 to be rotated into the most convenient position for repeated similar welds by the operator thereof. This ability to rotate is sometimes necessary to accommodate work which might be oriented so as not to otherwise fit into the slot.

Figure 1:
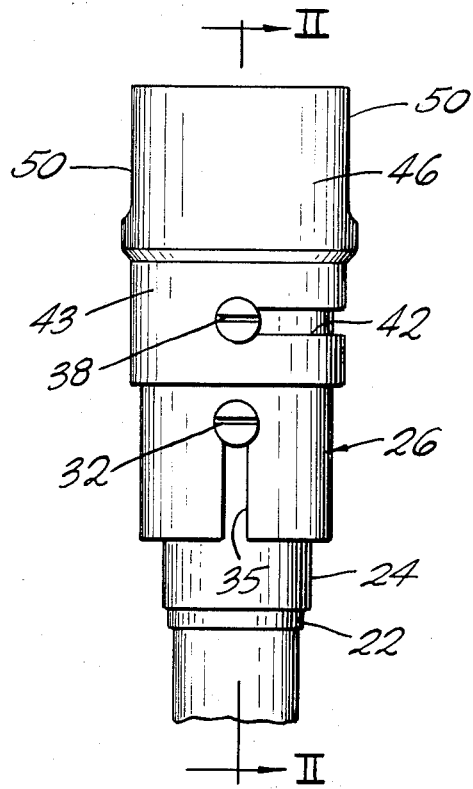
FIG. 1 is an elevational view of the welding tip assembly incorporating this invention.
Figure 3:
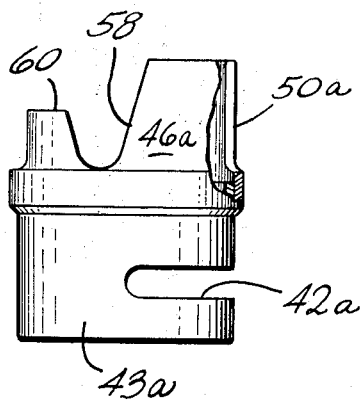
FIG. 3 is a fragmentary elevational view of another embodiment of the invention.

The embodiment of this invention shown in FIGS. 1 and 2 is particularly adapted for welding together reinforcement wires or the like which overlap one another in generally parallel fashion. FIGS. 3 and 4 illustrate an alternate embodiment of the hood, wherein the hood has been modified so as to accommodate work pieces which are not aligned but are skewed or perpendicular to each other. The parts in this embodiment which correspond to those previously described have the same reference numerals to which the distinguishing suffix "a" has been added. Thus, the same sleeves 24a, 26a and 43a are mounted on the electrode and are adjustable because of the slots 35a and 42a all as illustrated and described above. However, instead of having only the two cuts or grooves 50 in opposite sides of the hood 46a, there are provided two sets of opposite slots 50a and 58.

In accordance with another aspect of the invention, the cylinder forming the hood 46a has been partially tapered inwardly towards the top of the hood and the height of the hood does not remain constant but varies around the circumference so as to make the canopy more maneuverable. Specifically, to allow the hood 46a to clear obstructions at one side, a portion 60 of the hood to one side of the slot 58 is reduced in height by about one-half. The slots 58 differ from the slots 50 and 50a by being off-centered with respect to the axis of the hood and the sleeves. Thus, there is an unequal amount of the hood 46a positioned on the two sides of the slot 58 and it is the side having the lesser circumference which forms the portion 60.

The embodiment of the invention shown in FIGS. 3 and 4 is particularly adapted, as will be readily apparent to those skilled in the art, for the welding of two wires or rods positioned at approximately a 90 degree angle with respect to one another such as shown in FIG. 4. The non-symmetrical positioning of the slots 50a and 58 in this situation permits, of course, the weld to be made at a point where the work pieces abut or lie closely adjacent one another.

While the invention has been described in connection with the preferred embodiments, it will be understood that it is not intended to limit the invention to that described. For example, although only two embodiments are illustrated, it will be perfectly apparent that the concepts disclosed and claimed herein are applicable in the formation of canopies in widely differing welding environments, the position and number of the work positioning grooves as well as the overall shape of the component depending upon the characteristics and relative positions of the work pieces to be joined. Therefore, it is intended to cover all alternatives, modifications and equivalents as may be included within the spirit and scope of the invention as defined by the following claims.

The embodiments of the invention in which an exclusive property or privilege is claimed are defined as follows:

1. A work-holding member for attaching to a welder for the welding of at least two work pieces, said member comprising a mounting sleeve having an axis; a second sleeve telescopically and longitudinally slideably mounted to said mounting sleeve; a third sleeve telescopically and rotatably mounted to said second sleeve first locking means joining said second sleeve to said mounting sleeve for locking said second sleeve against longitudinal movement with respect to said mounting sleeve; second locking means joining said third sleeve to said second sleeve for locking said third sleeve against rotational movement with respect to said second sleeve; a hood coupled in fixed relation to said third sleeve and concentric therewith; and means integral with said hood for gripping together work pieces.

2. The work-holding member as defined in claim 1 wherein said gripping means includes a slot passing through said hood, said slot having sides which taper together toward the bottom thereof.

3. The work-holding member as defined in claim 2 wherein said hood is cylindrical and said slot has a rounded bottom to accommodate a rounded work piece.

4. A work-holding member for attaching to a welder for the welding of at least two work pieces, said member comprising a mounting sleeve having an axis, a cylindrical hood including a slot passing through said hood, said slot having sides which taper together toward a rounded bottom thereof to accommodate and grip together rounded work pieces, means for adjusting said hood along the axis of said sleeve including a second sleeve telescoped over said mounting sleeve and including a slot in one wall thereof extending part of the length of said second sleeve, and means for rotating said hood about said axis, said rotating means includes a screw threaded into said second sleeve and a third sleeve depending from said hood, said third sleeve having a slot passing 180 degrees around the circumference thereof and accommodating said screw but not the head of said screw, whereby the tightening of said screw holds the third sleeve in the position into which it has rotated as guided by said screw.

5. The work-holding member as defined in claim 4 wherein more than one slot passes through said hood.

6. A work-holding member for attaching to a welder for the welding of at least two work pieces, said member comprising a mounting sleeve having an axis, a cylindrical partly tapered hood whose height varies along its circumference, including a slot passing through said hood, said slot having sides which taper together toward a rounded bottom thereof to accommodate and grip together rounded work pieces, means for adjusting said hood along the axis of said sleeve including a second sleeve telescoped over said mounting sleeve and including a slot in one wall thereof extending part of the length of said second sleeve, and means for rotating said hood about said axis, said rotating means includes a screw threaded into said second sleeve and a third sleeve depending from said hood, said third sleeve having a slot passing 180 degrees around the circumference thereof and accommodating said screw but not the head of said screw, whereby the tightening of said screw holds the third sleeve in the position into which it has rotated as guided by said screw.

7. A work-holding member for attaching to a welder for the welding of at least two work pieces, said member comprising a mounting sleeve having an axis; a second sleeve telescoped over said mounting sleeve, said second sleeve having a slot in one wall thereof extending longitudinally part of the length of said second sleeve; a first locking and guiding means engaging said slot for locking said second sleeve against movement with respect to said mounting sleeve and for guiding the movement of said second sleeve when in an unlocking position; a hood; hood mounting means mounting said hood on said second sleeve for rotatable movement with respect thereto and including a circumferential slot in one wall of said hood mounting means which extends generally circumferentially around said hood mounting means; a second locking and guiding means engaging said slot for locking said hood mounting means and said hood against rotation with respect to said second sleeve and for guiding the rotational movement of said hood when in an unlocking position; means integral with said hood for gripping together work pieces.

8. The work-holding member as defined in claim 7 wherein said second locking and guiding means includes a screw threaded into said second sleeve; said hood mounting means comprising a third sleeve depending from said hood and being received on said second sleeve, said third sleeve having said circumferential slot therein, said circumferential slot passing 180° around the circumference thereof and accommodating said screw but not the head of said screw, whereby the tightening of said screw holds said third sleeve in the position into which it has rotated as guided by said screw.

* * * * *

U. S. DEPARTMENT OF COMMERCE

PATENT OFFICE

CERTIFICATE OF CORRECTION

Patent No. 2,813,512                  November 19, 1957

Clarence O. Schrader

It is hereby certified that error appears in the printed specification of the above numbered patent requiring correction and that the said Letters Patent should read as corrected below.

Column 3, line 28, for "microscopically" read --macroscopically--.

Signed and sealed this 25th day of February 1958.

(SEAL)
Attest:
KARL H. AXLINE

Attesting Officer

ROBERT C. WATSON
Commissioner of Patents